J. G. BARBOUR.
BRICK.
APPLICATION FILED FEB. 6, 1913.
1,070,870.
Patented Aug. 19, 1913.
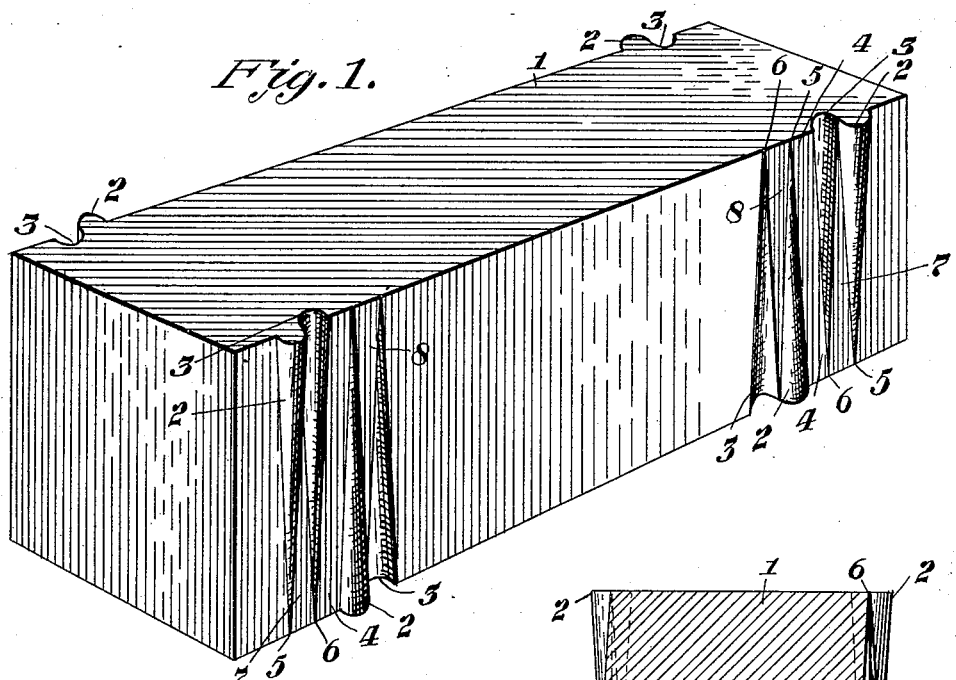
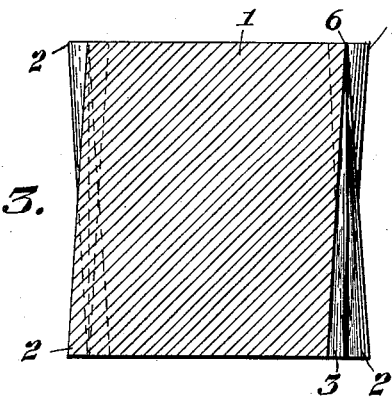
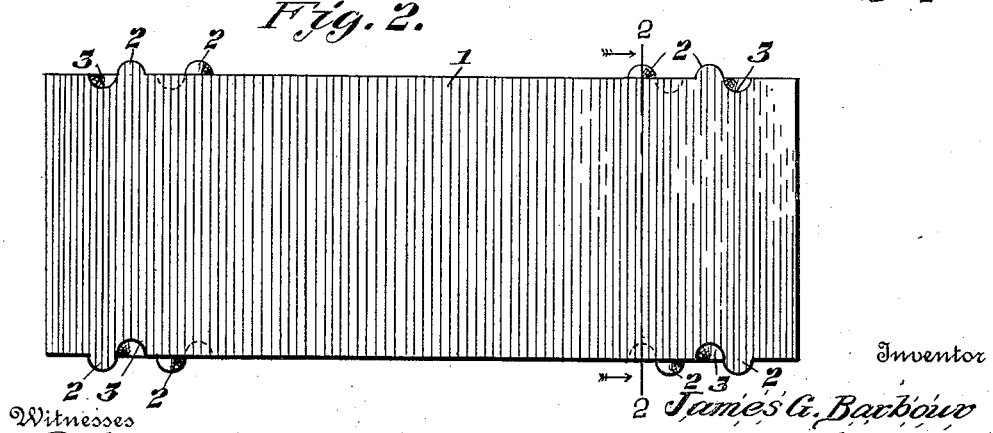

UNITED STATES PATENT OFFICE.

JAMES G. BARBOUR, OF CANTON, OHIO.

BRICK.

1,070,870.  Specification of Letters Patent.  Patented Aug. 19, 1913.

Application filed February 6, 1913. Serial No. 746,450.

*To all whom it may concern:*

Be it known that I, JAMES G. BARBOUR, a citizen of the United States, residing at Canton, in the county of Stark and State of Ohio, have invented certain new and useful Improvements in Brick, of which the following is a specification.

The object of the present invention is to provide means for spacing the adjacent faces of the bricks or blocks from each other when placed in position for use, thereby providing room for placing tar or cement or other adhesive substance between the faces of the bricks or blocks and when said tar, cement or other adhesive substance has become hardened it will serve to hold the brick in relationship with reference to each other. This object together with other objects readily apparent to those skilled in the art, I attain by the construction illustrated in the accompanying drawings, although my invention may be embodied in a variety of other mechanical forms, the construction illustrated being chosen by way of example.

In the accompanying drawing—Figure 1 is a perspective view of the brick. Fig. 2 is a top or edge view. Fig. 3 is a section on line 2—2, Fig. 2.

Similar numerals of reference indicate corresponding parts in all the figures of the drawing.

In the accompanying drawing, 1 represents the brick which is preferably rectangular in general outline and is formed in the usual manner, so far as regards the manufacture of the brick. The brick 1 is primarily intended for use as a paving brick or block and the proper number of bricks or blocks are to be laid upon a suitable foundation or road-bed in the usual manner. The side faces of the bricks or blocks are provided near the ends of the bricks or blocks with the conical shaped ribs 2, which ribs are oppositely disposed. Adjacent the oppositely disposed conical ribs 2 are located the oppositely disposed conical grooves 3. The oppositely disposed conical ribs and grooves are formed in pairs and the pairs of the ribs and grooves are spaced a short distance apart, thereby producing the plain surface 4 intermediate the innermost rib and the outermost groove. By forming the ribs and grooves conical they are brought to what might be called diminishing points as illustrated at 5 and 6.

It will be understood that by forming the grooves and ribs conical there will be produced upon the side surfaces the elongated V-shaped portions 7 and 8. It will be understood that by forming the alternating cone-shaped ribs upon the faces of the bricks that when said bricks are placed in position to produce a paved surface the side faces will be spaced a short distance from each other, which space provides for the introduction of tar, cement or other adhesive substance while in a plastic state and after such adhesive substance has become hardened the bricks will be prevented from lateral displacement or in other words will be bound together or cemented together in such a manner that lateral displacement is impossible. It will be understood that by providing the conical shaped grooves and filling said conical shaped grooves with tar, cement or other adhesive substance while in a plastic state after the same has become hardened the conical shaped grooves will be filled with rigid material, thereby assisting in preventing any relative lateral displacement of the series of bricks or paving blocks. It will be understood that by forming the ribs 2 and the grooves 3 so as to extend entirely across the side faces of the brick, the brick or blocks can be laid without any regard to which edge of the brick or block is the top or bottom edge, thereby producing what might be termed an interchangeable brick or block.

Having fully described my invention what I claim as new and desire to secure by Letters Patent, is—

1. As an improved article of manufacture, a brick or block formed rectangular, the side faces of said brick or block provided with oppositely disposed conical ribs and grooves, said oppositely disposed ribs and grooves extending entirely across the side faces of the brick or block, and the adjacent ribs and grooves oppositely disposed with reference to each other.

2. As an improved article of manufacture, a brick or block formed rectangular, the side faces of said brick or block provided with oppositely disposed conical ribs and grooves, said conical ribs and grooves formed in pairs and extending entirely across the side faces of the brick or block, each pair of the ribs and grooves oppositely disposed.

3. As an improved article of manufacture, a brick or block formed rectangular, the side faces thereof provided with oppositely disposed conical ribs and grooves formed in pairs, the innermost rib and outermost groove of each pair of ribs and grooves spaced from each other, said pairs of ribs and grooves located near the ends of the brick or block.

4. As an improved article of manufacture, a brick or block formed rectangular, the side faces thereof provided with oppositely disposed conical ribs and grooves, elongated V-shaped plane surfaces located between adjacent ribs and grooves, and in a plane parallel with the plane faces of the brick or block.

5. As an improved article of manufacture, a brick or block formed rectangular, the side faces thereof provided with oppositely disposed conical ribs and grooves, elongated V-shaped plane surfaces located between adjacent ribs and grooves, and in a plane parallel with the plane faces of the brick or block, said ribs and grooves and V-shaped plane surfaces located adjacent the ends of the brick or block.

6. As an improved article of manufacture, a brick or block, the side faces of said brick or block provided with oppositely disposed conical ribs and grooves, said ribs and grooves extending entirely across the faces of the brick or block.

In testimony that I claim the above, I have hereunto subscribed my name in the presence of two witnesses.

JAMES G. BARBOUR.

Witnesses:
  JOHN H. BISHOP,
  HAZEL OWEN.

Copies of this patent may be obtained for five cents each, by addressing the "Commissioner of Patents Washington, D. C."